Feb. 21, 1967 J. B. DAVIS 3,305,399
MICROBIAL PROCESS OF PRODUCING ELECTRICITY
Filed July 11, 1962
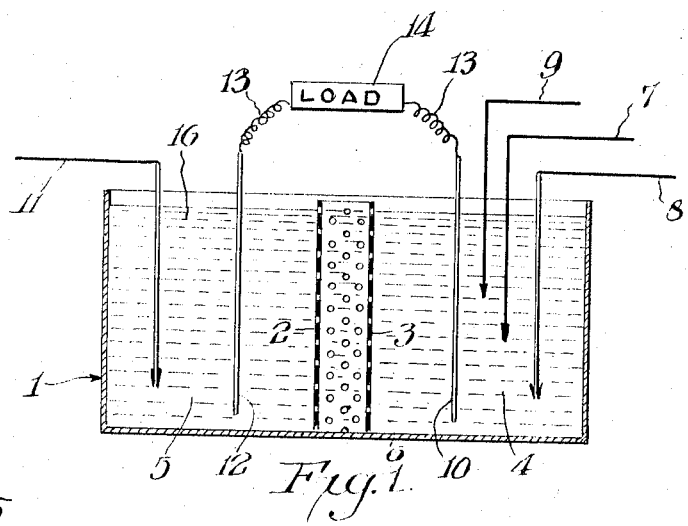
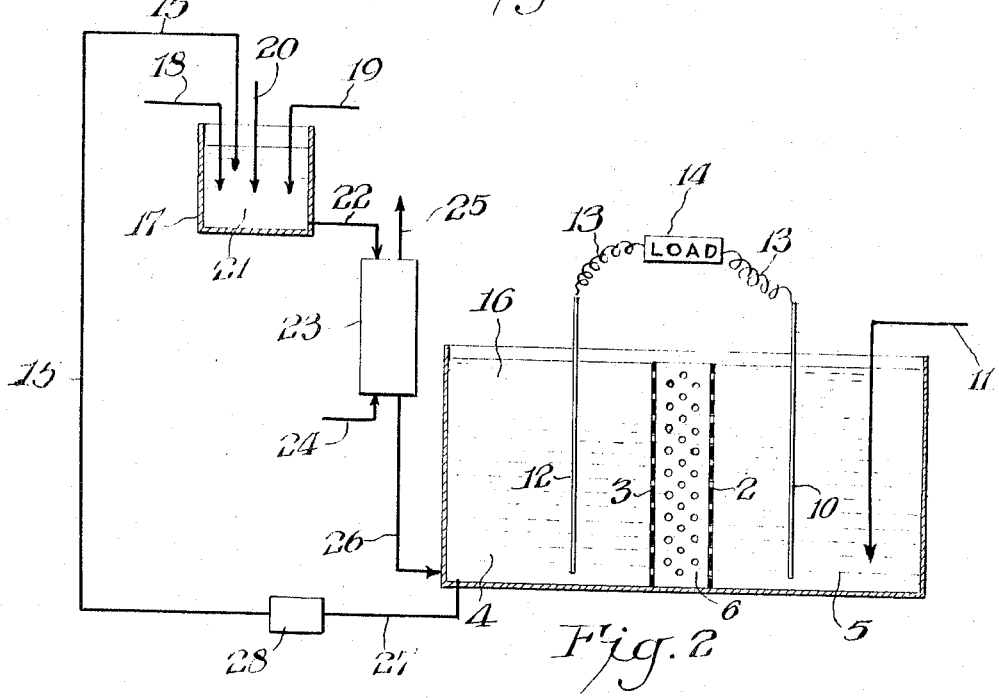
INVENTOR:
John B. Davis
BY
Oswald G. Hayes
ATTORNEY.

United States Patent Office 3,305,399
Patented Feb. 21, 1967

3,305,399
MICROBIAL PROCESS OF PRODUCING
ELECTRICITY
John B. Davis, Dallas, Tex., assignor to Mobil Oil
Corporation, a corporation of New York
Filed July 11, 1962, Ser. No. 209,086
12 Claims. (Cl. 136—86)

This invention relates to microbial fuel cells and, more particularly, it relates to fuel cells in which hydrocarbons are used indirectly as an energy source.

It is well known that biological reduction-oxidation reactions are a source of electrical energy. However, this source has not been exploited for a number of reasons. One of the reasons is that the known metabolic processes, while creating a potential, are unable to sustain it and only negligible power has been produced.

Thus, an objective of this invention is the provision of a method for sustaining the electrical output of microbial fuel cells. Another purpose is supplying fuels and reactions which afford the spontaneous production of electrical energy. A still further aim is to utilize metabolic processes of microorganisms to produce electrical energy. These and other objects will appear hereinafter.

The purposes of this invention are accomplished by charging a half-cell of a fuel cell with fuel, which is a product of microbial oxidation of a hydrocarbon being a micro-organism that has been grown on a hydrocarbon, under anaerobic conditions in the presence of an anode and simultaneously charging a second half-cell with an oxidizing environment in the presence of a cathode while separating the two half-cells by a semi-permeable membrane to maintain the said anaerobic conditions and aerobic conditions and to permit the flow of hydroxyl ions, the said anode and cathode being connected by an electrical conductor through a load receiving element. Thus, the process of this invention produces useful electric power from metabolic processes of microbes. These organisms convert or oxidize hydrocarbons, and in turn the cells themselves and the chemicals therein become fuel. With the oxidation of the intracellular fuel at an anode, electrons are released to an external circuit, which generally has a load-bearing unit in it, and these electrons at the cathode, which is bathed in oxygen, reduce oxygen to oxides. These in turn travel through an electrolyte to the anode to complete the circuit.

This invention will be further understood by reference to the examples and figures which are given for illustrative purposes only and are not limitative.

FIGURE 1 is a line diagram showing the relationship of the half-cells, the membrane, the electrodes and the load; and FIGURE 2 is a similar diagrammatical view showing a means of preparing a microbial culture fuel cell mixture separately and adding the mixture to the cell.

From FIGURE 1 it will be seen that a vessel 1 is divided by membranes 2 and 3 into three compartments: the half-cell 4, the half-cell 5, and the separator cell 6. The half-cell 4 is the anaerobic cell; it has microbes or a feed line 7 for microbes in it, a feed line 8 for food for the microbes, if such is desired, a feed line 9 for a hydrogen acceptor or other additives if such are being used and an anode 10. The half-cell 5 has in it a feed line 11 for oxygen and nearby a cathode 12. The cathode and the anode are connected through wire 13 to a load bearing device 14. The liquid material 16 is a salt solution such as, for example, a 1% to 3% aqueous solution of sodium chloride buffered to a pH of 7 with disodium acid phosphate and potassium dihydrogen phosphate. It should be noted also that in the biological half-cell only one feed line need be used, although occasionally it is preferred to bring to the microbes with their intracellular products the fuel that is desired to be consumed—that is, converted to intracellular material, right in the half-cell. Since the conversion to intracellular products is done aerobically, such feeding of fuel involves a shut-down of the half-cell during the oxidation of the fuel by the microorganisms. In many instances, no inlets at all are used, the materials being transferred in bulk. It will also be appreciated that the biological half-cell, as can the others, may be equipped with means, such as a drainage valve, to remove spent or undesired material.

Using equipment and substantially neutral, non-toxic conductive solutions as those described above, the microbial metabolic process (utilizing stored, intracellular fuel) creates a half-cell potential in the presence of at least one anode in the biological half-cell relative to the potential in the cathodic half-cell. For the latter, generally oxygen is made to contact an electrode. The resultant aerobic cathode is kept separated from the anaerobic anode by the presence of a permeable membrane and preferably by the presence of two such membranes located fairly near each other and separating the vessel into three compartments, these being the cathodic half-cell, the walled section and the anodic half-cell. Into the walled section 6, both membranes creating it being permeable, is bubbled oxygen-free nitrogen. Thus, the aerobic and anaerobic cells are effectively separated and no oxygen permeates into the anaerobic half-cell. Any nitrogen permeating into the cathode is very small in amount and is harmless. For completion of the electrical circuit a wire 13 connects the anode 10 and cathode 12 and the electric current is made to do work at load 14. It will also be appreciated that the biological half-cell, as can the other, may be equipped with means to remove spent or undesired material, such as a drainage valve or recycling means line 27, pump 28 and feed line 15 (FIGURE 2).

As an example, a certain polymer being metabolized by bacteria is converted to hydrogen ions and electrons, as by such changes as the following in which the unit $C_4H_6O_2$ is the recurring unit in poly(hydroxybutyrate), an intracellular product utilized in this invention:

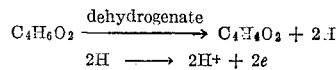
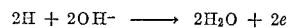

or

this occurring in the anodic cell. Dehydrogenation is the first step. The electrons pass via the wire to the other half-cell leaving the biological half-cell with a positive potential. To this anodic half-cell are attracted hydroxyl ions which are being formed at the electrode bathed by oxygen:

$$2e + \tfrac{1}{2}O_2 + H_2O \longrightarrow 2OH^-$$

and the electric circuit is complete. The hydroxyl or oxide ions migrating from the non-biological half-cell leave the electrode there with a positive charge so that the metallic electrode becomes positive to attract more electrons from the biological half-cell. The hydroxyl ions migrate to the anode through the surrounding electrolyte.

This can be a solution of a wide variety of salts or mixtures of salts. Most frequently the electrolyte will be a culture medium in which the microbes grow well. For example, the electrolyte can be a simple solution of one salt, sodium chloride, for example, or it may be a mixture of sodium, potassium and ammonium salts such as the nitrates, phosphates, surfates and the acid salts of those. Usually, the pH is kept between about 6.0 to about 8.0, a pH of 7.0 being preferred. Nitrogen may be supplied in the form of urea or asparagine or similar organic forms providing neutrality and these are preferred to the nitrates.

The fuel cells of this invention can be used in series or in parallel, if desired, to provide additional current.

In FIGURE 2 is shown a modified form of apparatus used in this invention. Vessel 17 is an oxidator equipped with an inlet 18 for microbial cultures and inlets 19 and 20 for air or oxygen, hydrocarbons and other materials as desired, such as nutrients. Thus, a medium 21 containing micro-organisms that are growing on hydrocarbons is formed. After substantial growth is obtained the medium 21 may be piped through inlet 22 into exchanger 23 in which the air or oxygen in medium 21 is replaced by nitrogen or some non-oxidative gas coming into container 23 via inlet 24. The air or oxygen admixed with nitrogen is flushed out exit 25. The resultant oxygen-free medium is then passed through pipe 26 into half-cell 4 for anaerobic respiration used in the production of the electric current. Recycling is effected by means of lines 27 and 15 and pump 28.

The invention will be further understood by reference to the examples given below. These are illustrative only and are not to be taken as limitative.

*Example I*

Into an oxidator 17 was placed 3 mg. of *Nocardia salmonicolor*, strain No. 107–332, being fed through 18 along with a culture medium made up of the following materials in the amounts indicated (g./l. of water): urea (1.0), disodium acid phosphate (0.3), potassium dihydrogen phosphate (0.2), magnesium sulfate septahydrate (0.2) and ferrous sulfate septahydrate (0.2). The oxidator is equipped with the inlets 19 or 20 for gaseous or other materials and through it fuel is fed to the Nocardia. This fuel is generally a hydrocarbon and preferably it is a gaseous hydrocarbon such as ethane, propane or n-butane or similar n-alkanes. It is fed admixed, usually about 10% to about 30%, with about 90% to about 70% of air.

The oxidator is equipped with an impeller and a sparger (not shown) to stir the reaction medium 21. The impeller is driven by a motor at high speeds and the mass is vigorously agitated. The sparger serves to feed the fuel into the mass. As a result a shearing action is imparted to the mass and to the cells and very large contact is made between the cells and the fuel. The equipment is further described in co-pending application S.N. 149,112 filed on October 31, 1961.

In such equipment ethane is fed and rapid growth of the Nocardia results. The cells feed on the hydrocarbon and convert it into products stored within the cells for future metabolic use. These products, depending on the hydrocarbons used, include triglycerides of palmitic, stearic and oleic acids, waxes such as cetyl palmitate and stearyl stearate from long chain alkanes as $C_{14}$, $C_{16}$, $C_{18}$, or $C_{20}$, and polymers such as poly(beta-hydroxybutyrate).

The resultant microbial suspension is then fed through pipe 22 into a cell 23 through which nitrogen is passed by way of pipe 24 to remove oxygen, and then it is passed to the anaerobic half-cell 4 which contains the anode while the cathode in half-cell 5 is kept under aerobic conditions. Nitrogen is generally bubbled through the partition 6 formed by the permeable membranes 2 and 3. In this example the nocardial cells contain the intracellular fuel and a hydrogen acceptor, such as methylene blue, is present. Under these conditions in the anodic half-cell a current is generated and is made to act on load device 14. Load device 14, for example, may be a transistorized circuit which is powered by the above process.

*Example II*

The biological fuel cell shown in FIGURE 1 was charged with nocardial cells after determining an E.M.F. of 50 mv. attained in the absence of the cells. Addition of the cells led to an E.M.F. of 115.

The addition through feed line 9 of 0.25 mg. of methylene blue led to 192 mv. and an addition 0.25 mg. led to 245 mv. and a current of 0.05 milliampere. The methylene blue decolorizes as it is reduced in the anodic cell. It and the nocardial suspension can be cycled so that it periodically comes into contact with air and then is returned to the anaerobic half-cell. This oxidizes the hydrogen acceptor and it also rejuvenates the microbes. In an instance such as above when a hydrocarbon is being fed the cells grow in the cyclic period building up stored cellular products so that those products consumed in the half-cell in the production of current are replaced.

*Example III*

A gaseous mixture of n-butane and air (15% and 85%, respectively) was fed to a small inoculum (50 ml.) of *Nocardia salmonicolor* contained in vessel. The mineral salts medium used as the source of essential minerals contained the following salts, the number in parentheses being the number of grams per liter of distilled water: ammonium sulfate (1.0), disodium hydrogen phosphate (0.3), potassium dihydrogen phosphate (0.2), magnesium sulfate septahydrate (0.2), sodium carbonate (0.1), calcium chloride (0.01), ferrous sulfate septahydrate (0.005) and manganous sulfate (0.002). During the feeding of the hydrocarbon the microbial mixture was vigorously stirred and exposed to light. By this procedure a very good growth of Nocardia resulted which contained considerable amounts (20% or more) of a polymer stored in the cells. The cells so prepared were isolated by centrifugation and these were placed in bio-cell 4 where under anaerobic conditions the stored food, the said polymer and other intracellular materials, were anaerobically oxidized with the production of an electric current.

In a similar experiment the microorganisms were grown on n-propane. While the intra-cellular products include beta-carotene as did those in the n-butane run, the polymer in this instance was not unsaturated nor was it a copolymer. The polymeric material obtained was poly (hydroxybutyrate). As part of this run, the cells are removed periodically from the fuel-cell and are re-fatted, being replaced by fresh, vigorous cells for continuous generation of current.

*Example IV*

To a medium containing a small inoculum of *Bacterium nitrimethanicum*, a microorganism described in my copending application Ser. No. 165,510, filed on January 11, 1962, and now U.S. Patent No. 3,210,179, is passed air to which has been added 30% by volume of methane. The medium is devoid of nitrogen in any form, except, of course, that already in the cells of the microorganism. Growth is vigorous and as the culture grows, nitrogen is fixed in the form of protein within the cells, for example. The resultant cells are collected and transferred to the fuel cell of FIGURE 1. Again, power is generated comparable to that of Example I.

*Example V*

An activated sludge enriched with microbes that grow on hydrocarbons was prepared as disclosed in copending application Ser. No. 158,655, filed on December 12, 1961, and now U.S. Patent No. 3,152,983, and the microbes therein were fed oily waste matter. The sludge contained a variety of microorganisms that oxidize hydrocarbons and among these oxidizers were various Bacillus, Clostridia, Pseudomonas, Mycobacterium, Nocardia yeast-like torula and filamentous fungi such as Penicillium and Phycomyces. The oily wastes used may be refinery wastes or industrial wastes and the hydrocarbons oxidized are miscellaneous liquids and solids. Generally, a refinery or oil field waste water containing oil is used. With a substantial amount of cells on hand the fuel cell shown in FIGURE 1 is charged and is operated on a continuous basis producing electrical power as described above.

*Example VI*

To an oxidator such as shown in FIGURE 2 which contains *Nocardia salmonicolor,* strain 107–332, is added a mixture of hydrocarbons that contains n-hexadecane and n-octadecane. As the cells grow and multiply they synthesize waxes and store them in the lipid fraction of the cells. These waxes include cetyl myristate, cetyl palmitate, stearyl palmitate and stearyl stearate, as disclosed in my copending application Ser. No. 149,831, filed on October 21, 1961, and now U.S. Patent No. 3,169,099. The fatted cells are then transferred to the fuel cell passing through chamber 23 for flushing with nitrogen as discussed above. As one batch of fatted cells is being flushed, a new batch is being fatted in vessel 17.

The fatted cells are ultimately passed to anaerobic half-cell 4 for metabolism leading to the generation of current. When the cells are de-energized, but still living, they are withdrawn from half-cell 4; fresh cells are passed to the half-cell and the hungry cells are placed in vessel 17 for refattening.

*Example VII*

In an experiment similar to that described in Example III, ethane was fed to *Nocardia corallina* in an oxidator like 17 shown in FIGURE 2 with the purpose of producing beta-carotene as an intracellular product, as disclosed in copending application Ser. No. 149,112, filed on October 31, 1961, now abandoned, and refiled on May 7, 1964, as Serial No. 370,392. The liquid mass was stirred vigorously with an impeller (3000 r.p.m.) while the organism fed on the ethane. Cells containing beta-carotene in the amount of 0.8 mg./gm. of dried cells were produced.

These cells are then placed in anaerobic half-cell 4. With the cathode being bathed by oxygen, current travels acting on load device 14.

In the above examples a negative electrode potential (open circuit voltage) of 200 mv. and a current as high as 0.5 milliampere is observed. When certain salts, potassium ferricyanide, for example, are added at both electrodes currents up to 4.5 milliamperes (at 600 mv.) are observed. Transistorized devices are activated to advantage.

From the above examples it will be noted that a large variety of microorganisms can be used in the processes of this invention. These include, in addition to those mentioned in the examples, *Nocardia corallina*—strain M.O., *Nocardia paraffinae, Nocardia opaca, Pseudomonas nitrimethanica, Pseudomonas nitrimethanica* var. *citreus, Pseudomonas putida, Pseudomonas oleovorans, Pseudomonas aeruginosa, Pseudomonas fluoroscens, Mycobacterium phlei, Mycobacterium lacticola, Mycobacterium paraffinicum*—smooth strain, and *Mycobacterium paraffinicum,* among others. For best results when nocardial cells are being used in the anaerobic half-cell, a hydrogen acceptor is required. These are materials like methylene blue and methyl viologen and their use is claimed and described in more detail and in a different aspect in copending application Ser. No. 209,088, filed July 11, 1962. The presence of a hydrogen acceptor is not needed to accomplish the purposes of this invention, for most of the large variety of microorganisms referred to above do not need the acceptor. It will be appreciated, however, that in the growing state these various microorganisms are usually kept in media that have pH values of about 6.0 to about 8.0, the pH being preferably 7.0. Buffers, such as phosphates like potassium dihydrogen or disodium acid phosphate, can be added to the oxidators to maintain the desired pH.

The media will contain a mineral salt mixture which will include salts like the carbonates, chlorides, sulfates, phosphates, molybdates and the cations are such materials as potassium sodium manganese, iron and the like. Generally, the oxidizer is run at atmospheric pressure at a temperature of about 75° F. to about 115° F.

The hydrocarbon that is used may be a single hydrocarbon or a mixture and it may be gaseous, liquid or solid. Generally, the hydrocarbon is fed admixed with air, the mixture containing from about 15% to about 50% of gaseous hydrocarbon and about 1% to about 3% of liquid or solid hydrocarbon. Hydrocarbons that are used include methane, ethane, propane, n-butane, toluene, xylene, mesitylene, ethylbenzene, diethylbenzene, propylbenzene, butylbenzene, amylbenzene, hexylbenzene, heptylbenzene, octylbenzene, p-cymene, methylnaphthalene, ethylnaphthalene, methylcyclopentane, dimethylcyclopentane, trimethylcyclopentane, ethylcyclopentane, diethylcyclopentane, propylcyclopentane, butylcyclopentane, amylcyclopentane, hexylcyclopentane, heptylcyclopentane, amylcyclopentane, octylcyclopentane, methylcyclohexane, dimethylcyclohexane, trimethylcyclohexane, tetramethylcyclohexane, ethylcyclohexane, propylcyclohexane, isopropyl-4-methylcyclohexane, butylcyclohexane, amylcyclohexane, hexylcyclohexane, heptylcyclohexane, and octylcyclohexane. Also, normal hydrocarbons can be used such as n-hexadecane, n-tetradecane, n-octadecane, n-eisocosane, and n-dodecane. Oily materials such as mineral oils, paraffins, crude oil, partially refined oil, and the like may be used.

Of the various microorganisms that may be used the Nocardia are preferred. This is true because they are fast multipliers. For example, they multiply at a very rapid rate compared to Mycobacteria. The generation time of the Nocardia is about 30 minutes as compared to something like 24 hours for the Mycobacteria. Further, Nocardia grow very well on hydrocarbons and they are not limited in the kind and number of hydrocarbons that they can utilize as are some of the other organisms that are hydrocarbon oxidizers but only in a selective fashion. The conversion of inexpensive hydrocarbons to electrical energy by the microbial processes of this invention affords an attractive route to electrical power production.

Although the processes described above use living organisms, it is readily appreciated that the processes involved are chemical and electrical processes or manners of new manufacture all of which require an operator who maintains the appropriate conditions and drives the microorganisms to the desired results.

While the invention has been disclosed herein in connection with certain structural embodiments and certain procedural details, it is clear that changes, modification or equivalents can be used by those skilled in the art; accordingly, such changes within the principles of this invention are intended to be included within the scope of the claims below.

I claim:

1. A process for obtaining electrical power from metabolic processes of microorganisms which comprises converting hydrocarbons to oxygenated products stored in the cells of said microbes, thus producing stored, intracellular fuel, by allowing said microorganisms to feed on said hydrocarbons under aerobic conditions; placing the resultant microorganisms and stored, intracellular fuel in the anaerobic, anodic half-cell of a fuel cell that contains an electrolyte and by the metabolism at a pH of about 6.0 to about 8.0 of said cells releasing electrons to an external circuit; reducing oxygen in the cathodic half-cell at a cathode connected to said external circuit; and allowing the resultant ions to flow through said electrolyte to said anode to complete the circuit.

2. A process in accordance with claim 1 which includes the step of adding a hydrogen acceptor to the said anodic half-cell and in the presence of said microbes.

3. A process in accordance with claim 2 in which said acceptor is methylene blue.

4. A process in accordance with claim 2 in which the said acceptor is methylene blue and which process includes the step of exposing the reduced methylene blue to oxygen and returning the resultant oxidized form to the anodic half-cell.

5. A process in accordance with claim 1 in which said microorganisms are Nocardia.

6. A process in accordance with claim 1 in which after said metabolism has depleted the energy of said cells leaving them in need of food such cells are removed from the anodic half-cell and fed hydrocarbonaceous food to form additional oxidation products within the cell.

7. A process in accordance with claim 6 in which the removed microorganisms are replaced by fresh microorganisms to obtain said power in a continuous fashion.

8. A process for obtaining electrical power from hydrocarbons and from metabolic processes of microorganisms which comprises aerobically subjecting the hydrocarbons to the metabolic action of microorganisms; allowing the cells to grow and multiply and to convert said hydrocarbons into products stored within the living microorganisms; placing the said organisms in the anaerobic, anodic half-cell of a fuel cell; allowing the cells to metabolize the said stored products at a pH of about 6.0 to about 8.0 thereby releasing electrons to an external circuit; reducing oxygen at a cathode connected to said external circuit; and allowing the resultant ions to flow through said electrolyte to said anode to complete the circuit.

9. A process in accordance with claim 8 in which said hydrocarbon is gaseous.

10. A process in accordance with claim 8 in which said hydrocarbon is a liquid.

11. A process in accordance with claim 8 in which said hydrocarbon is a solid.

12. A process in accordance with claim 8 in which said microorganism is a Nocardia.

References Cited by the Examiner

UNITED STATES PATENTS 3,057,784   10/1962   Davis et al. _____ 195—28

FOREIGN PATENTS 249,016   3/1926   Great Britain.

OTHER REFERENCES

Business Week, May 6, 1961, p. 68.
Industrial Research, October 1961, pp. 23–24.
Journal of Bacteriology, vol. 21, January–June 1931, pp. 18–19.
Popular Science, January 1962, p. 29.
Science and Mechanics, August 1961, pp. 116–117.

WINSTON A. DOUGLAS, *Primary Examiner.*

JOHN R. SPECK, *Examiner.*

H. FEELEY, A. B. CURTIS, *Assistant Examiners.*